CALL TRACING CIRCUIT

Filed July 22, 1966

INVENTORS
J.G. PEARCE
W.W. PHARIS
G. O. K. SCHNEIDER
BY Dicke & Craig
ATTORNEYS

United States Patent Office 3,510,601
Patented May 5, 1970

3,510,601

CALL TRACING CIRCUIT

James G. Pearce, William W. Pharis, and Gerhard O. K. Schneider, Rochester, N.Y., assignors to Stromberg-Carlson Corporation, Rochester, N.Y., a corporation of Delaware Filed July 22, 1966, Ser. No. 567,205
Int. Cl. H04m 3/22
U.S. Cl. 179—18 4 Claims

ABSTRACT OF THE DISCLOSURE

A telephone call tracing circuit is disclosed wherein indicating devices, actuated by a predetermined amplitude of pulses from a test pulse generator, are coupled to telephone lines connected through at least two switching stages, for tracing communication paths therethrough.

The present invention relates in general to telephone communication systems, and more particularly, to a circuit for facilitating the tracing of calls through enclosed cross-point switches.

In telephone switching systems, the tracing of a call through step-by-step probing for potentials has proven to be generally unsatisfactory due to the time required by such a trial and error procedure for complete tracing of a call. In many cases, the tracing of a call may be required within a certain time period, such as prior to release by a calling or called subscriber, in which case the system for tracing the call must be very quick and accurate.

On the other hand, the tracing of calls through a telephone switching system using enclosed cross-point switches by visually inspecting the switches in a step-by-step process is not possible, and the probing for tones within the cross-point switching system is a slow and very tedious process.

It is therefore an object of the instant invention to provide an improved call tracing circuit for use with telephone systems.

It is another object of the instant invention to provide an improved call tracing circuit for use with telephone systems including enclosed cross point switching systems.

It is still another object of the instant invention to provide an improved call tracing circuit providing a quick and accurate means for tracing a call through a telephone switching system by visual means.

The instant invention provides an improved call tracing circuit utilizing an indicating means at the various switching stages of the switching system to pinpoint the path that a call takes through the system. In accordance with the invention, neon lamps may be utilized as the visual indicating means, with the neon lamps being responsive to a potential whose amplitude is sufficiently above the level or normal operating potentials to prevent operation thereof other than in response to a call tracing situation.

Figure 1:
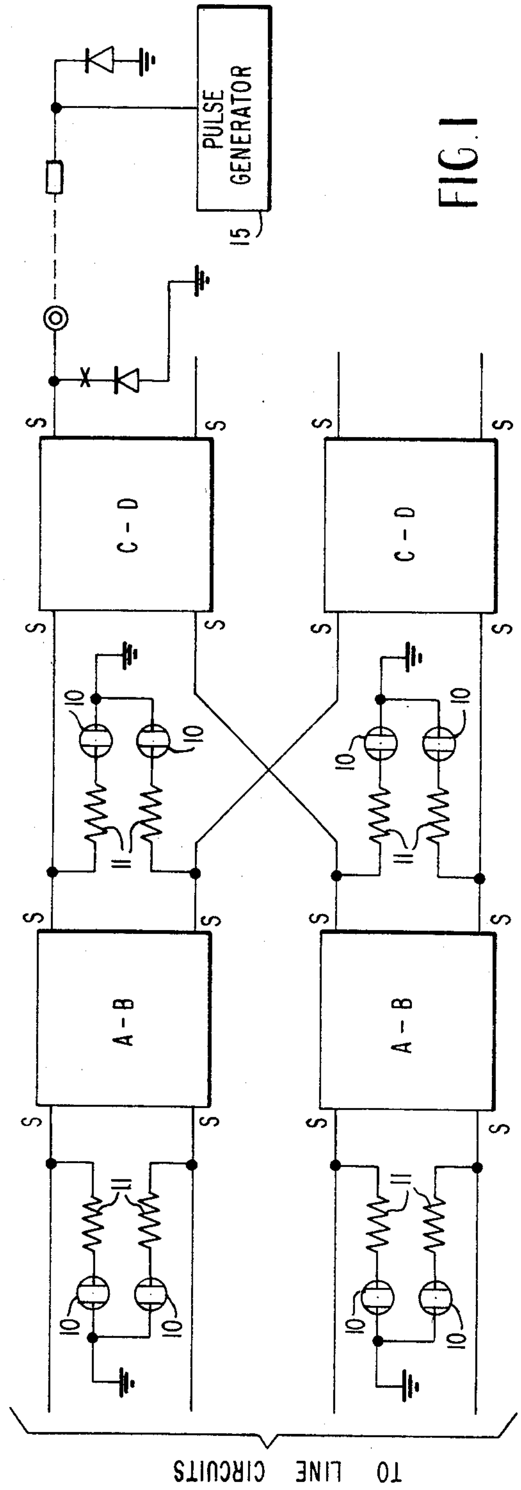
Figure 2:
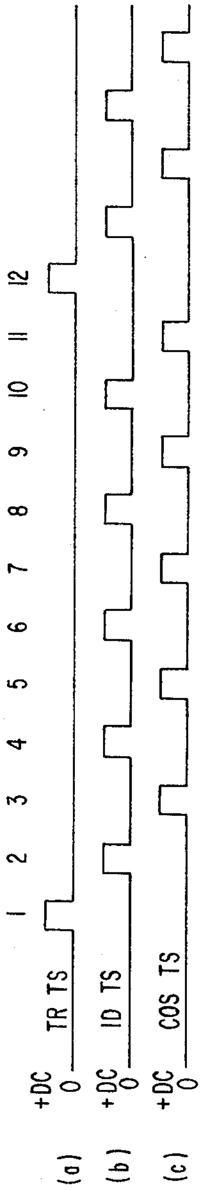

These and other objects, features and advantages of the instant invention will become more apparent from the following detailed description of the invention when taken in conjunction with the accompanying drawing which illustrates one example of the instant invention; and wherein:

FIG. 1 is a schematic block diagram of a telephone switching system with the call tracing circuit of the instant invention included therein; and FIG. 2 is a schematic diagram of the pulse wave forms for the instant invention in time relationship with the pulses of other service systems.

The call tracing circuit of the subject invention may be utilized with any known telephone switching system, but is of particular advantage in connection with switching systems using enclosed cross-point switches. The system of the present invention may also find utility in connection with the malicious call circuit arrangement disclosed in copending application Ser. No. 570,551 filed in the names of James G. Pearce et al. on Aug. 5, 1966 and assigned to the assignee of the present invention. In the latter system, means are provided for maintaining an open circuit condition to the calling subscriber line circuit in connection with a flashing indication by the called subscriber in combination with a programmed indication of malicious call service. With the calling line circuit maintained in the open condition by the malicious call circuit, a tracing tone generated either in the malicious call circuit or in the local exchange may be utilized in conjunction with the call tracing circuit of the instant invention to determine the origin of the call. As will be apparent from the following description, tracing tone may be applied to the switching system of the telephone exchange either automatically in accordance with the system disclosed in the above-mentioned application of James G. Pearce et al. or through application of a tracing tone through a test jack in a manual procedure, either of which procedures will serve to provide an indication of the path of a call through the system in accordance with the instant invention.

Referring now to FIG. 1, a plurality of enclosed cross-point switches A–B and C–D forming a portion of a telephone switching arrangement are interconnected in the well known manner to the sleeve leads S of the transmission circuit. In accordance with the instant invention, there is connected to each of the sleeve leads S connected to the enclosed cross-point switches A–B and C–D a neon lamp 10 and series resistance 11. The neon lamp may be of any known commercial type responsive to a predetermined minimum input voltage level for illumination.

When it is desired to trace a call through the switching system, a positive pulse source, such as a pulse generator 15 in FIG. 1, may be connected to the sleeve conductor S from either end of the connection to the switching system. The pulse generator 15 is shown connected at the output end of the switching system in FIG. 1, but as is apparent, the input may also be applied to the subscriber end of the switching system. The mark in the form of a ground applied to the sleeve connection S of the line to be traced serves as an indication of the beginning of the line, and so the pulse source is preferably applied at this point in performing the tracing operation. Lamps 10 are provided at the input stage and in the link used between the A–B and C–D switching stages along the path which the call takes through the switching system so as to provide a visual indication thereof. Due to the level required for the energizing of the neon lamps, the lamps will not light during normal operation since under such conditions their breakdown voltages will not be reached.

To avoid interference with other functions, such as class of service, marking or toll ticketing identification, the pulse generator 15 is synchronized with the supervisory telephone equipment to provide time divided pulses such that call marking is done at different intervals from the other functions. This synchronized application of tracing pulses to sleeve connection S by the pulse generator 15 is illustrated in FIG. 2. The test trace pulses are illustrated in the FIG. 2 in line *a* as being interspersed in time with the pulses representing toll ticketing identification in line *b* and class of service in line *c*. This synchronizing completely eliminates any chance of interference between the various pulses and the frequency of the test trace pulses utilized also prevents overheating of the coils of the relays and cross points locked to the sleeve connection S during the time that the neon lamp is lighted.

As indicated above, the call tracing circuit in accordance with the instant invention may be utilized in conjunction with automatic tone pulsing system such as disclosed in the above-mentioned application of James Gordon Pearce et al. as well as in conjunction with the portable application of a pulse generator to the individual line circuit.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A call tracing circuit for use with telephone communication systems comprising:

a first cross-point switching stage including a plurality of cross-point switches;

a second cross-point switching stage including a plurality of cross-point switches;

a first plurality of lines each connected with plural ones of said cross-point switches in said first switching stage;

a second plurality of lines each connected between plural ones of said cross-point switches in said first switching stage and plural ones of said cross-point switches in said second switching stage, thereby defining signal paths through said plural ones of said cross-point switches in said first and second switching stages to said first plurality of lines;

indicating means connected to each of said lines of said first and second plurality of lines and being responsive to a tracing signal having a predetermined voltage level and nonresponsive to any other signal on said lines; and signal generating means for applying a tracing signal at said predetermined voltage level to individual ones of said first and second plurality of lines through said switching stages thereby actuating said indicating means to indicate completed signal paths.

2. A call tracing circuit as defined in claim 1 wherein said indicating means is in the form of a gas lamp having a breakdown voltage equal to said predetermined voltage.

3. A call tracing circuit as defined in claim 1 wherein said signal generating means is in the form of a pulse generator.

4. A call tracing circuit as defined in claim 3 wherein said pulse generator produces a pulse train whose frequency is set to prevent interference with other supervisory signals in said lines and is sufficiently low to prevent overheating of the components of said cross-point switches.

References Cited

UNITED STATES PATENTS

| | | | |
|---|---|---|---|
| 2,857,470 | 10/1958 | Faulkner. | |
| 3,041,407 | 6/1962 | McKim | 179—18 |
| 3,280,268 | 10/1966 | Drake. | |

KATHLEEN H. CLAFFY, Primary Examiner

T. W. BROWN, Assistant Examiner